(12) United States Patent
Selby et al.

(10) Patent No.: US 6,784,942 B2
(45) Date of Patent: Aug. 31, 2004

(54) MOTION ADAPTIVE DE-INTERLACING METHOD AND APPARATUS

(75) Inventors: Steve Selby, Scarborough (CA); Daniel Stan, Richmond Hill (CA)

(73) Assignee: Genesis Microchip, Inc., Ontario (CA)

(*) Notice: Subject to any disclaimer, the term of this patent is extended or adjusted under 35 U.S.C. 154(b) by 502 days.

(21) Appl. No.: 09/970,984

(22) Filed: Oct. 5, 2001

(65) Prior Publication Data

US 2003/0071917 A1 Apr. 17, 2003

(51) Int. Cl.[7] .................................................. H04N 7/01
(52) U.S. Cl. ........................ 348/452; 348/451; 348/448; 348/441
(58) Field of Search ................................ 348/452, 451, 348/448, 441, 443, 459, 458, 699, 700, 701, 620, 669, 431.1; 375/240.01, 240.16; 382/300, 208, 236, 275

(56) References Cited

U.S. PATENT DOCUMENTS

| | | | |
|---|---|---|---|
| 4,789,893 A | | 12/1988 | Weston |
| 4,967,271 A | | 10/1990 | Campbell et al. |
| 4,989,090 A | | 1/1991 | Campbell |
| 5,446,498 A | * | 8/1995 | Boon ......................... 348/448 |
| 5,694,177 A | * | 12/1997 | Flannaghan et al. ........ 348/607 |
| 5,796,437 A | * | 8/1998 | Muraji et al. ............... 348/452 |
| 6,233,018 B1 | * | 5/2001 | Thomas ...................... 348/452 |
| 6,266,092 B1 | | 7/2001 | Wang |
| 6,330,032 B1 | * | 12/2001 | Boehlke ...................... 348/452 |
| 6,512,550 B1 | * | 1/2003 | de Garrido et al. ......... 348/452 |
| 6,630,961 B1 | * | 10/2003 | Shin et al. .................. 348/448 |
| 6,633,612 B2 | * | 10/2003 | Selby ..................... 375/240.16 |
| 6,636,267 B1 | * | 10/2003 | Adachi ....................... 348/448 |

* cited by examiner

*Primary Examiner*—Michael H. Lee
*Assistant Examiner*—Jean W. Désir
(74) *Attorney, Agent, or Firm*—Staas & Halsey LLP

(57) ABSTRACT

A system and method for generating an interpolated pixel at a vertical position in a field of a video frame. The method comprises the steps of receiving at least two pixels vertically adjacent the vertical position in the field and at least three pixels from at least one adjacent field, detecting a degree of motion in the vicinity of the interpolated pixel, providing weighting factors based on the degree of motion, and calculating the interpolated pixel based on a combination of weighted contributions from the at least two pixels and the at least three pixels. The weighted contributions are derived from a combination of the weighting factors and at least vertical-temporal and temporal interpolation. For at least one degree of said motion, the weighted contributions comprise at least (i) a first positive contribution derived from immediately adjacent ones of the at least two pixels, (ii) a second positive contribution derived from a central one of the at least three pixels located at the vertical position, and (iii) a negative contribution derived from the two of the at least three pixels that are immediately vertically adjacent the central pixel.

22 Claims, 17 Drawing Sheets

P = ALPHA * VERTICAL_TEMPORAL(A,B,D,E,F) + (1-ALPHA) * TEMPORAL(C,D)

MOTION ADAPTIVE DE-INTERLACING METHOD AND APPARATUS

FIELD OF THE INVENTION

This invention relates in general to digital video signal processing and more particularly to a method and apparatus for de-interlacing video fields to progressive scan video frames using motion adaptive techniques.

BACKGROUND OF THE INVENTION

The NTSC and PAL video standards are in widespread use throughout the world today. Both of these standards make use of interlacing in order to maximize the vertical refresh rate thereby reducing wide area flicker, while minimizing the bandwidth required for transmission. With an interlaced video format, half of the lines that make up a picture are displayed during one vertical period (e.g. the even field), while the other half are displayed during the next vertical period (e.g. the odd field) and are positioned halfway between the lines displayed during the first period. While this technique has the benefits described above, the use of interlacing can also lead to the appearance of artifacts such as line flicker and visible line structure.

It is well known in the prior art that the appearance of an interlaced image can be improved by converting it to non-interlaced (progressive) format and displaying it as such. Moreover, many newer display technologies, for example Liquid Crystal Displays (LCDs), are non-interlaced by nature, therefore conversion from interlaced to progressive format is necessary before an image can be displayed at all.

Numerous methods have been proposed for converting an interlaced video signal to progressive format. For example, linear methods have been used whereby missing pixels in the progressive output sequence are generated as a linear combination of spatially and/or temporally neighbouring pixels from the interlaced input sequence, such as described in U.S. Pat. No. 6,266,092 (Wang). Although this approach may produce acceptable results under certain conditions, the performance generally represents a trade off between vertical spatial resolution and motion artifacts. Rather than accept this compromise, it is possible to achieve enhanced performance by employing a method that is capable of adapting to the type of source material. For instance, it is well known that conversion from interlaced to progressive format can be accomplished with high quality for sources that originate from motion picture film or from computer graphics (CG). Such sources are inherently progressive in nature, but are transmitted in interlaced format in accordance with existing video standards. For example, motion picture film created at 24 frames per second is converted to interlaced video at 60 fields per second using a process known as 3:2 pull down, where 3 fields are derived from one frame and 2 are derived from the next, so as to provide the correct conversion ratio. Similarly, a computer graphics sequence created at 30 frames per second is converted to interlaced video at 60 fields per second using a pull down ratio of 2:2, where 2 fields are derived from each CG frame. By recognizing that a video sequence originates from a progressive source, it is possible for a format converter to reconstruct the sequence in progressive format exactly as it was before the conversion to interlaced format.

For video that is not derived from a progressive source, there are other alternatives to linear processing. For instance, U.S. Pat. No. 4,989,090 (Campbell) describes one approach to a technique generally referred to as motion adaptive de-interlacing. In this method, missing pixels are generated in one of two different ways depending on whether motion is detected in the vicinity of the missing pixel. If little or no motion is detected, then the missing pixel is derived primarily from its temporal neighbours, thereby giving the best vertical resolution for static portions of the image. If a higher amount of motion is detected, then the missing pixel is derived primarily from its vertical neighbours, thereby avoiding motion artifacts, albeit at the expense of vertical resolution. Depending on the degree of motion detected, the missing pixel may be derived using a greater or lesser contribution from its temporal neighbours and vertical neighbours. This technique is used today in numerous consumer electronic systems. It should be noted that, in this specification, the term "degree of motion" includes the absence of motion.

In order to achieve adequate performance in the above system, it is necessary for the system to derive the missing pixel from its vertical neighbors even when only very small amounts of motion are detected. This is necessary to avoid motion artifacts commonly referred to as "feathering" which result when pixels from different fields are erroneously combined in the presence of motion. Since the result obtained when interpolating between vertical neighbours, as in the motion case, may be quite different from that obtained when using the temporal neighbours, as in the static case, certain artifacts may be produced as a result of a transition between the two cases. The artifacts are a result of the property that a small change in an otherwise static portion of the image may produce a much larger change at the output. Consequently, noise may be amplified and vertical detail may tend to scintillate in the presence of subtle motion. These artifacts are inherent in such systems and may be reduced but not completely eliminated.

The preceding problem may be partially alleviated by transitioning smoothly between the motion and static cases with varying degrees depending on the level of motion detected. In order to avoid the feathering artifacts described above, experimental observation has shown that the initial transition towards the motion case must begin for small amounts of motion (in the range of 2–3% of full scale value) and that full transition to the motion case must occur shortly thereafter (in the range of 5–10% of fall scale value). Therefore, the function that relates the weightings of the static and motion cases to the measured motion value will have high gain in the transition region. Hence, the system will, to a large degree, still possess the property that a small change at the input may produce a much larger change at the output. This is a property which, as described earlier, can lead to noise and scintillation artifacts. It is an objective of the present invention to provide a method to alleviate the problems associated with the critical transition region of motion adaptive de-interlacers.

The following patents are relevant as prior art relative to the present invention:

| U.S. Patent Documents | | |
|---|---|---|
| 4,989,090-Campbell | Jan. 29, 1991 | Television Scan Line Doubler Including Temporal Median Filter |
| 4,967,271-Campbell | Oct. 30, 1990 | Television Scan Line Doubler Including Temporal Median Filter |
| 4,789,893-Weston | Dec. 6, 1988 | Interpolating Lines of Video Signals |
| 6,266,092-Wang | Jul. 24, 2001 | Method and Apparatus for Video Line Multiplication with Enhanced Sharpness |

SUMMARY OF THE INVENTION

According to the present invention, a method and apparatus are provided for motion adaptive de-interlacing of interlaced signals with greater immunity to noise and scintillation artifacts than is commonly associated with prior art solutions. In the present invention, vertical interpolation, which the prior art employs in the presence of motion, is replaced by a two-dimensional, non-separable, vertical-temporal interpolation filter with specific frequency characteristics. The vertical-temporal filter is designed such that for static image portions, the contribution from the current field (the field for which the missing pixel is being derived) is enhanced by a contribution from one or more adjacent fields so as to provide an estimate for the missing pixel which is a better approximation to that which would have been calculated using temporal interpolation as normally employed in the absence of motion. The fact that the estimate for the missing pixel will be similar for static portions of the image regardless of whether vertical-temporal or temporal interpolation is used, reduces the artifacts associated with the transition between the two processing modes. Furthermore, the vertical-temporal filter is designed such that feathering artifacts in moving portions of the image are avoided.

Although vertical-temporal interpolation outperforms vertical interpolation for static portions of an image, vertical interpolation is generally better than vertical-temporal interpolation for areas of high motion, since the adjacent field component associated with the latter comes from an area of the image that may be uncorrelated to the current field component. Thus it may not be obvious to a person of ordinary skill in the art that vertical-temporal interpolation would be preferred over vertical interpolation in the presence of motion, as provided by the method of the present invention. However, the benefit of this approach derives from the fact that there is a finite range of velocities for which vertical-temporal interpolation offers an advantage over vertical interpolation. Since the transition between the static and motion modes needs to occur even for small amounts of motion, vertical-temporal interpolation is utilized in cases where it offers an advantage. The lesser performance of vertical-temporal interpolation at higher levels of motion is generally acceptable to the human eye.

BRIEF DESCRIPTION OF THE DRAWINGS

A description of the prior art and of the preferred embodiment of the present invention are provided hereinbelow with reference to the following drawings in which.

DESCRIPTION OF THE PREFERRED EMBODIMENTS

Figure 1:
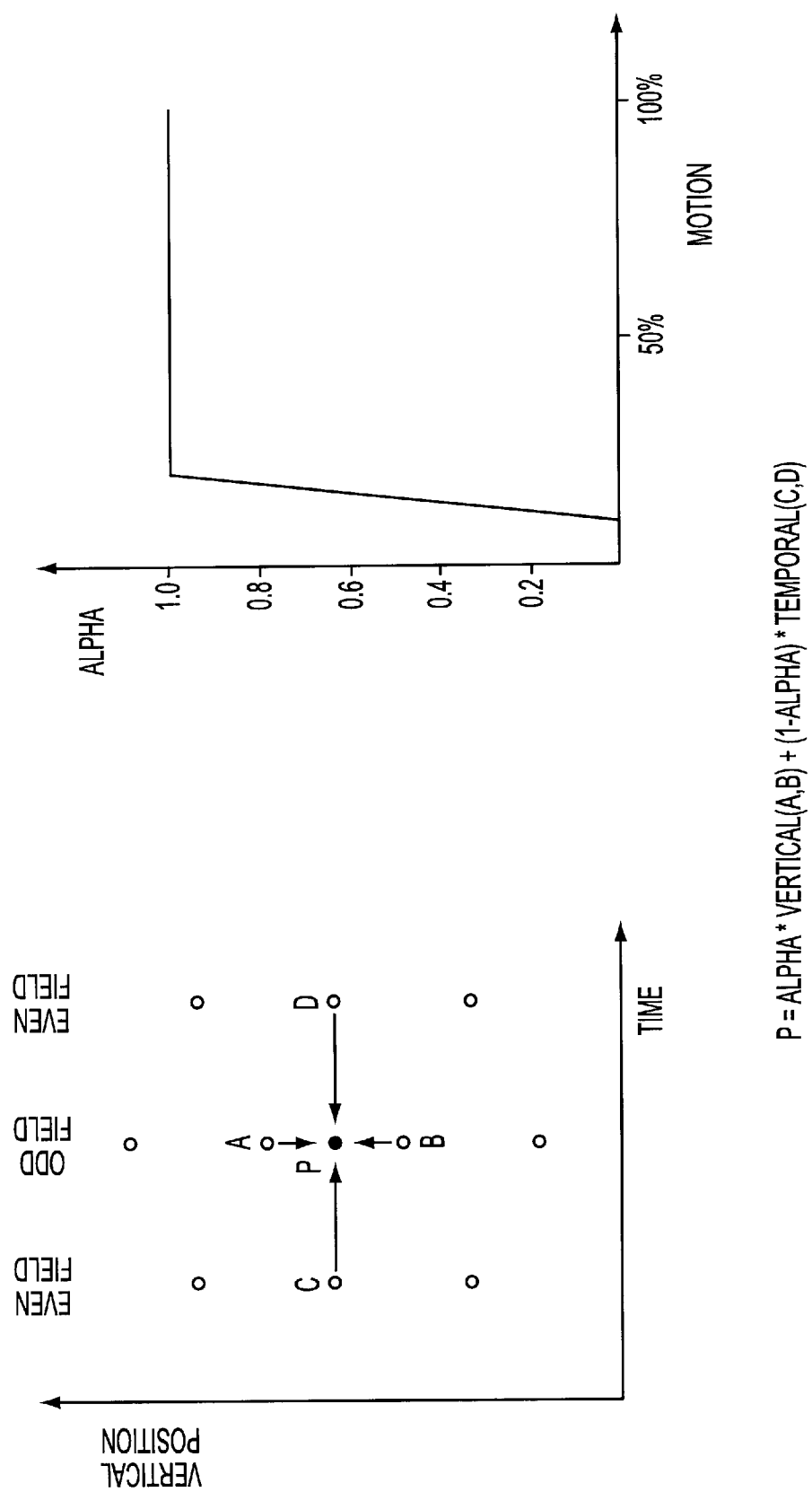
FIG. 1 is a schematic representation showing how a missing pixel may be generated using a combination of vertical and temporal interpolation depending on the presence of motion, according to the prior art.

FIG. 1 depicts a method of line doubling similar to that described in U.S. Pat. No. 4,989,090 (Campbell). According to the illustrated method, a missing pixel P is generated using a combination of vertical interpolation and temporal interpolation, depending on the presence of motion in the vicinity of P. In the presence of motion, P is derived primarily from its vertical neighbours A and B. In the absence of motion, P is derived primarily from its temporal neighbours C and D. It should be noted that in this example and those that follow, temporal interpolation means "zero order" interpolation in which the interpolated pixel is taken as one of either C or D, however, other forms of temporal interpolation are also possible. Depending on the degree of motion detected, a weighting function ALPHA is used to control the contribution taken from the vertical and temporal neighbours of P. In order to avoid feathering artifacts, the relationship between ALPHA and the degree of motion detected must be approximately as shown in the plot at the right of FIG. 1. This plot shows a steep transition from the static case towards the motion case in the presence of small amounts of motion.

Figure 2:
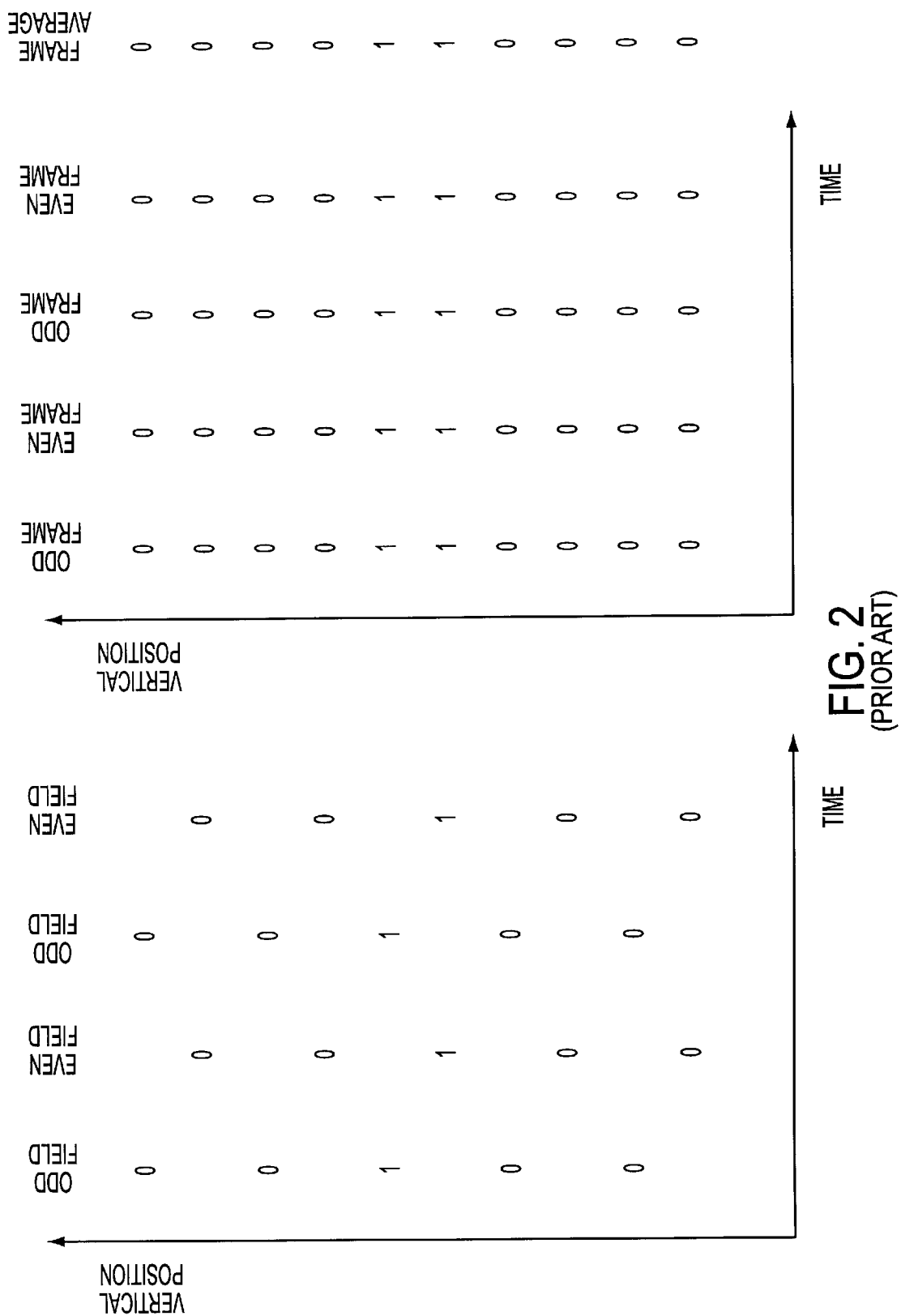
FIG. 2 is a numerical example of temporal interpolation, according to the prior art.

FIG. 2 shows how the method of FIG. 1 produces the desired effect in the absence of any motion. The left half of the figure shows an input sequence of interlaced fields and the right half shows the resulting line doubled output sequence. In both diagrams, the vertical axis represents the vertical position of each line within the image and the horizontal axis represents the sequence of fields/frames in time. The horizontal dimension of the image is normal to the page such that each point in the diagram represents an entire line of pixels viewed edgewise. Each field in the input sequence contains a single "1" while the rest of the field contains "0". This is representative of a single horizontal white line on a black background and is commonly known as an impulse. Since the "1" is present at the same location in fields of the same parity, no motion is detected and the method of FIG. 1 will degrade to purely temporal interpolation. The resulting line doubled sequence will contain two "1's" in each output frame and all output frames will be identical which is the desired result for an image that contains no motion.

Figure 3:
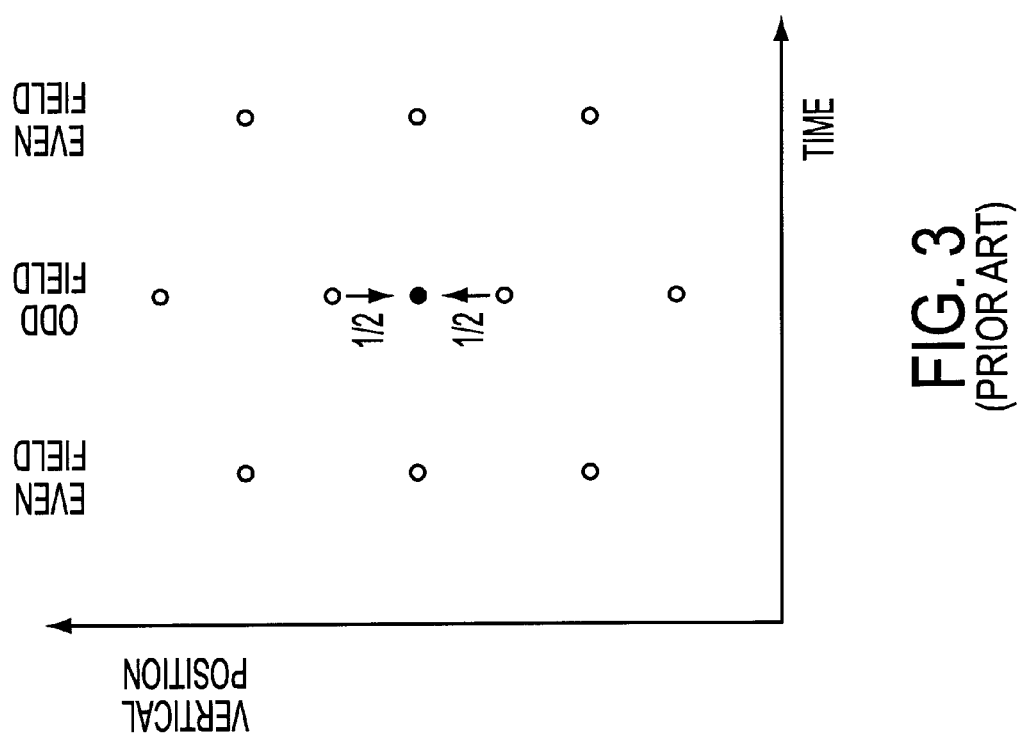
FIG. 3 is a schematic representation showing how a missing pixel may be generated using vertical interpolation, according to the prior art.
Figure 4:
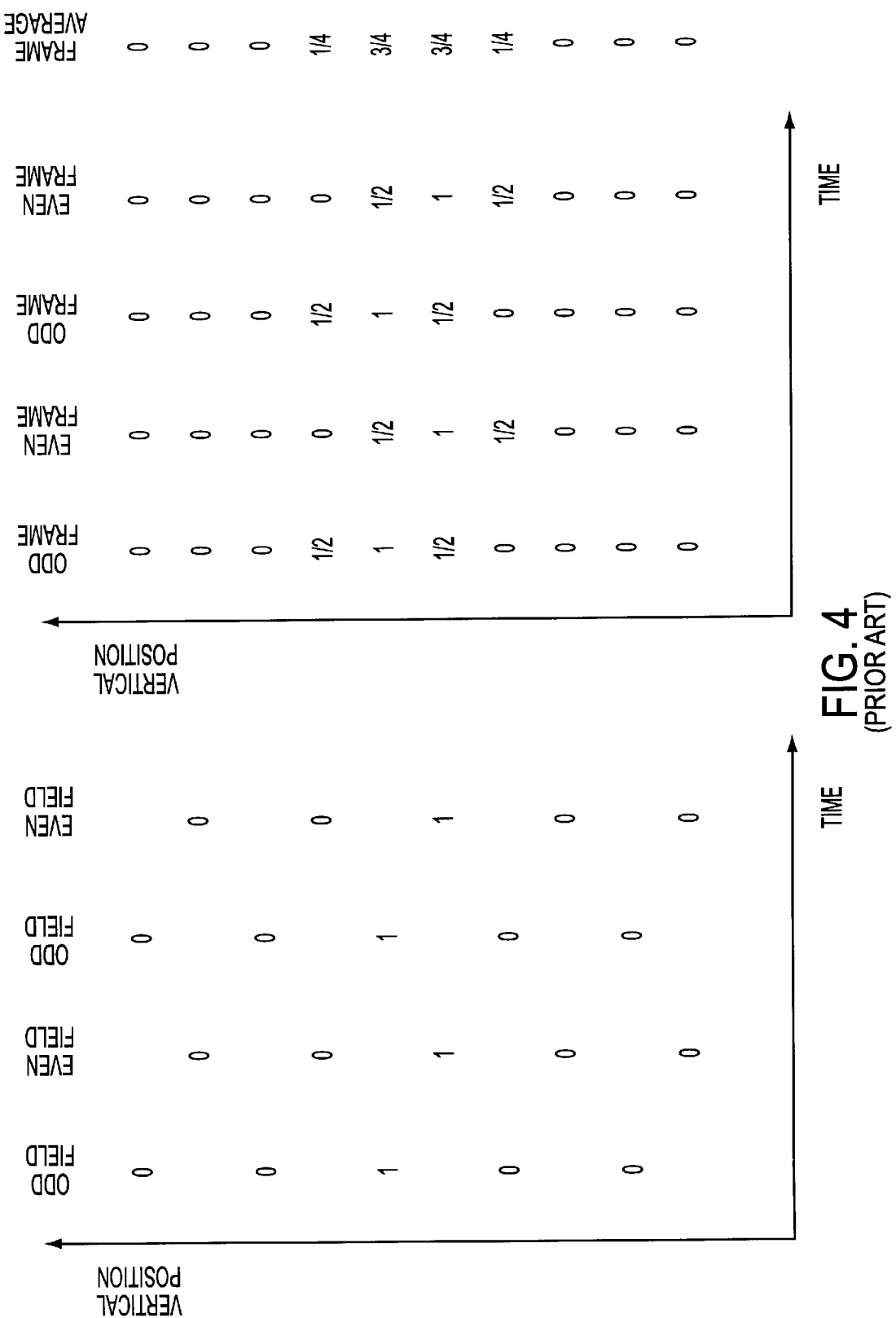
FIG. 4 is a numerical example of vertical interpolation, according to the prior art.

Now let us assume that a small change in the input sequence due to either noise or the onset of motion causes the system of FIG. 1 to transition to the motion case. In the presence of motion, the missing pixel P is calculated using vertical interpolation which as shown in FIG. 3 can be performed simply by taking the average of the two closest vertical neighbours, A and B. FIG. 4 shows the impulse response to the same input sequence as in FIG. 2 only this time using vertical interpolation corresponding to the motion case. The noise and/or onset of motion that caused the transition to the motion case is not reflected in the data values of FIG. 4 since it is assumed to be small and to simplify the example. Note the periodic nature of the line doubled output sequence despite the fact that the input is essentially static.

Figure 5:
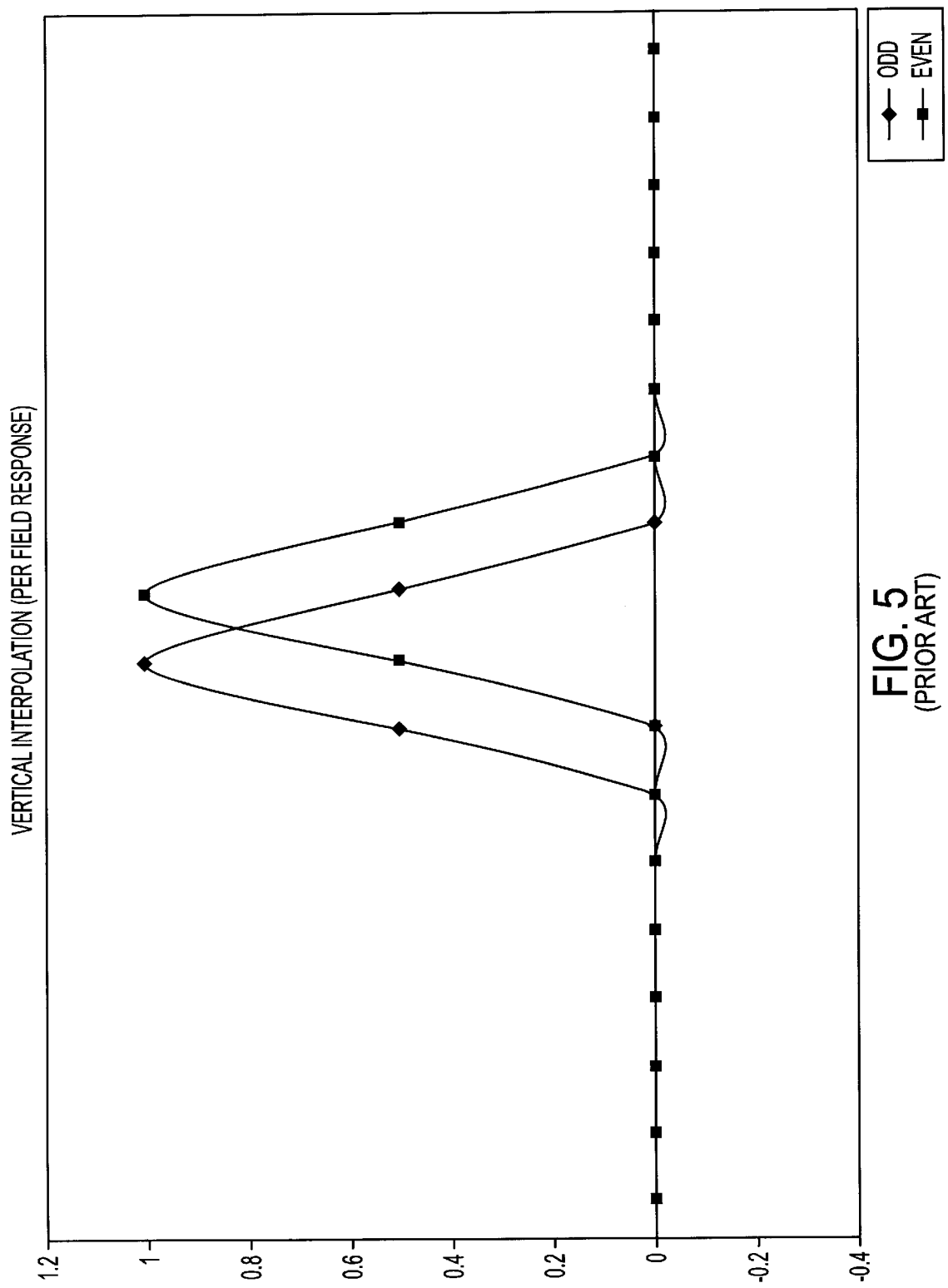
FIG. 5 and FIG. 6 are graphical representations of the example of FIG. 4.

FIG. 5 shows a graphical representation of the example of FIG. 4. The two lines represent the impulse response for each field when vertical interpolation is used. A distinct offset will be noted between the response for each field which suggests that the apparent position of each pulse as perceived by the viewer will change from one field to the next. Indeed, on display devices with fast response times such as CRTs, the line will appear to flicker despite the use of progressive scanning.

Figure 6:
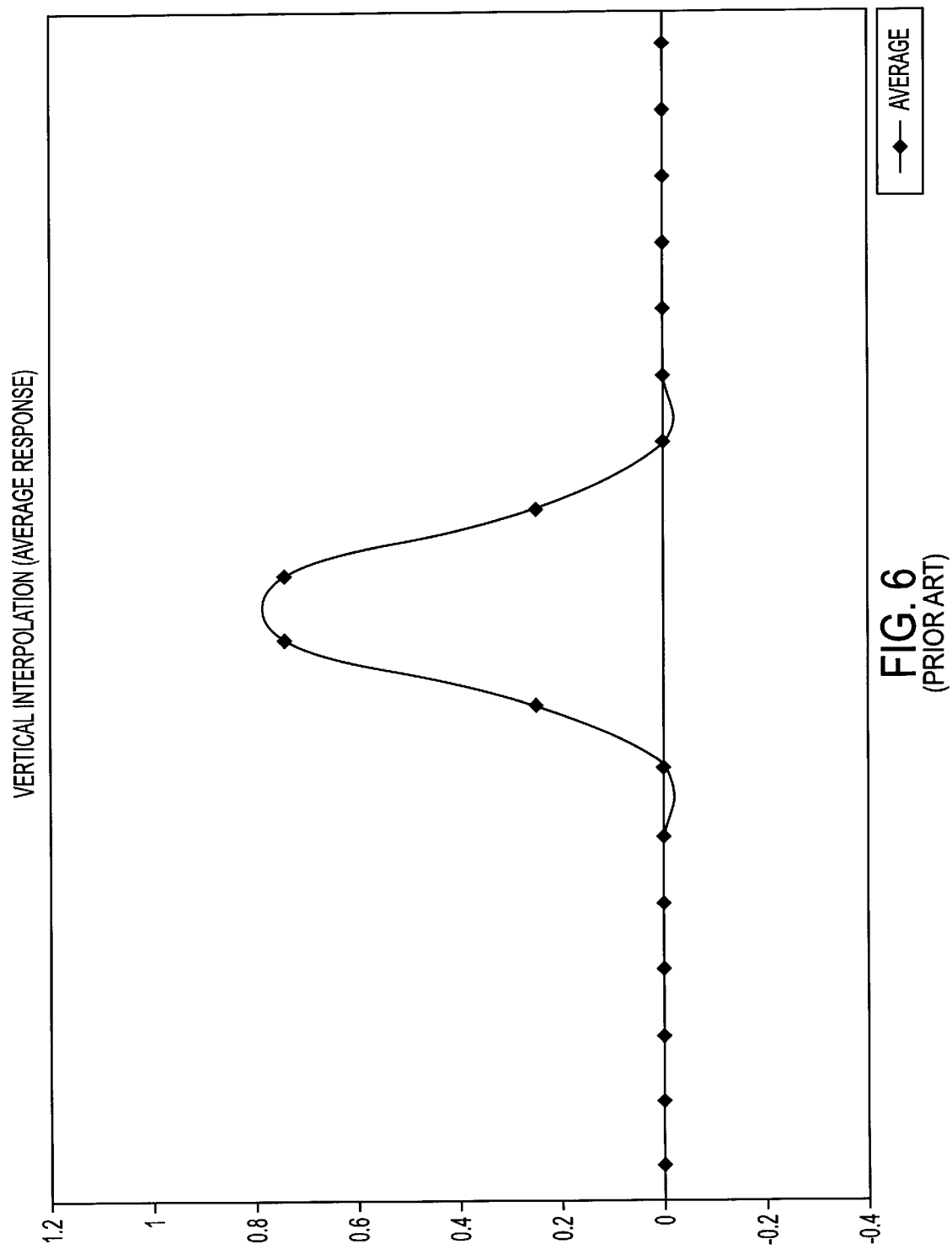

Since the eye acts as an integrator, the viewer will tend to perceive the overall sharpness of the impulse based on the average of the two frames. FIG. 6 shows a graphical representation of the frame averaged impulse of the example of FIG. 4. The rounder flatter appearance of this impulse is characteristic of a loss of sharpness perceived by the viewer. Moreover, the sudden change in appearance associated with the onset of motion from the pristinely reproduced impulse provided by temporal interpolation, to the poorly reproduced impulse provided by vertical interpolation, is most problematic. It is this phenomenon which may result in the amplification of noise and the appearance of scintillation artifacts commonly associated with motion adaptive line doublers.

Figure 7:
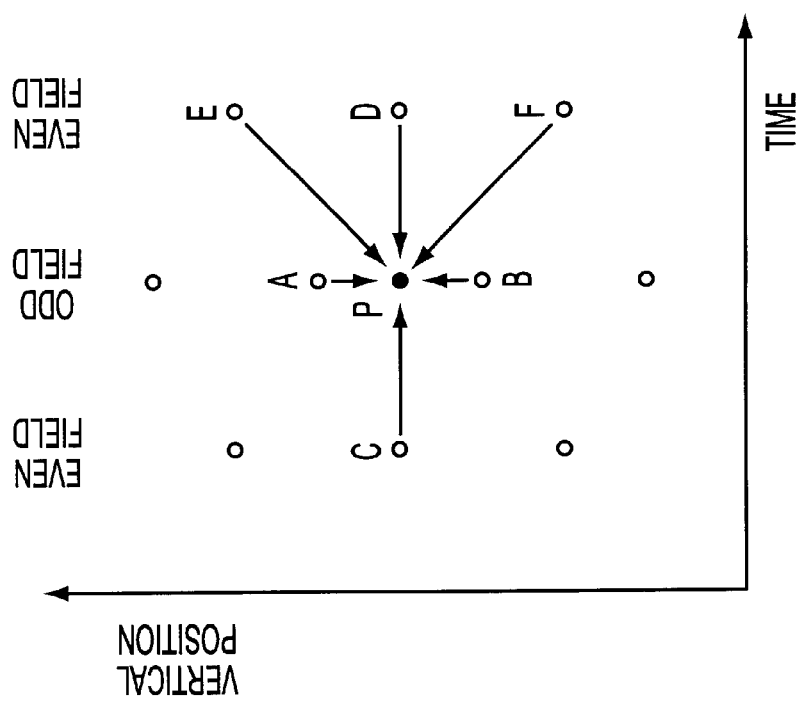
FIG. 7 is a schematic representation showing how a missing pixel may be generated using a combination of vertical-temporal and temporal interpolation depending on the presence of motion, according to the method of the present invention.

FIG. 7 shows a first embodiment of the method of the present invention. In the illustrated method, the missing pixel P is generated from neighbouring pixels depending on the degree of motion detected in the vicinity of P. In the absence of motion, P is generated using temporal interpolation as in prior art methods, which may also include "zero order" temporal interpolation. In the presence of motion, rather than resorting to vertical interpolation as in the prior art, non-separable vertical-temporal interpolation is used to provide an improved impulse response for static and slowly moving image portions, thereby easing the difficulties associated with the critical onset of motion.

Figure 8:
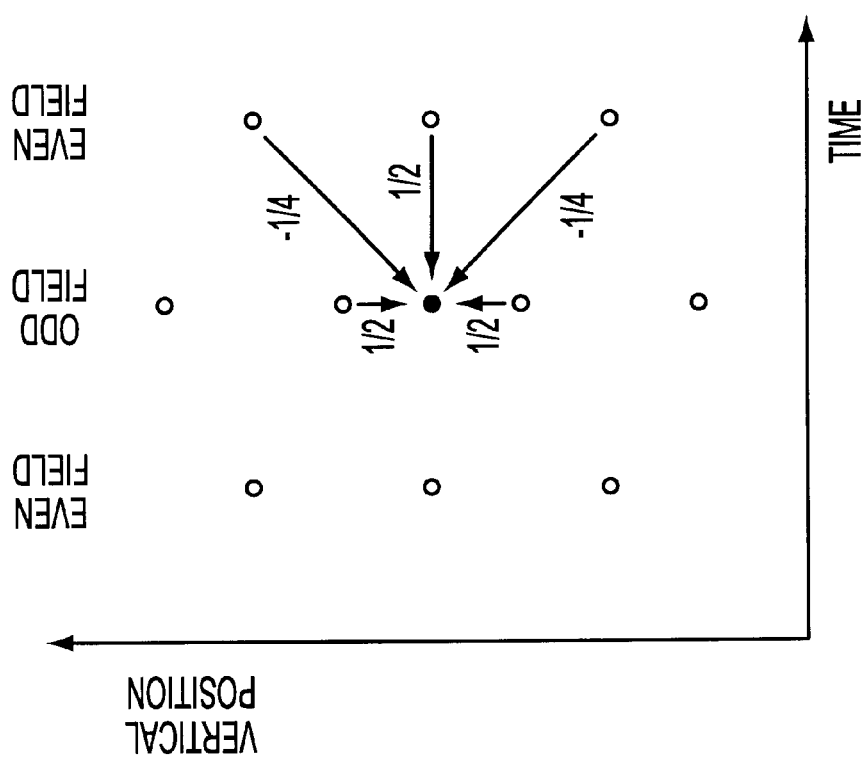
FIG. 8 is a schematic representation showing how a missing pixel may be generated using vertical-temporal interpolation, according to the method of the present invention.

FIG. 8 shows a schematic representation of how a missing pixel at a vertical position may be generated using vertical-temporal interpolation according to one embodiment of the present invention. The missing pixel P derives a major contribution from the current field, that is the field from which P is considered to be missing. In this example, the current field contribution is exactly equal to what it would have been if pure vertical interpolation had been used, as shown in FIG. 3. P derives a further contribution from an adjacent field which is used to enhance the impulse response for static and slowly moving image portions while avoiding feathering artifacts. A vertical-temporal filter derives contributions from at least two pixels vertically adjacent the vertical position in the current field and at least three pixels from one or more adjacent fields. A first positive contribution is derived from immediately adjacent ones of the at least two pixels in the current field. A second positive contribution is derived from a central one of the at least three pixels in the vertical position of the missing pixel and a negative contribution is derived from the two of the at least three pixels that are immediately adjacent the central pixel. The specific coefficients for one embodiment are shown in FIG. 8. It should be noted that there are many other variations within the sphere and scope of the invention, such as increasing the number of taps in any or all of the fields, or increasing the number of adjacent fields from which a contribution is derived. Additionally, a vertical-temporal interpolator with a boosted high temporal frequency characteristic may be used, as disclosed in U.S. Pat. No. 6,266,092 (Wang).

Figure 9:
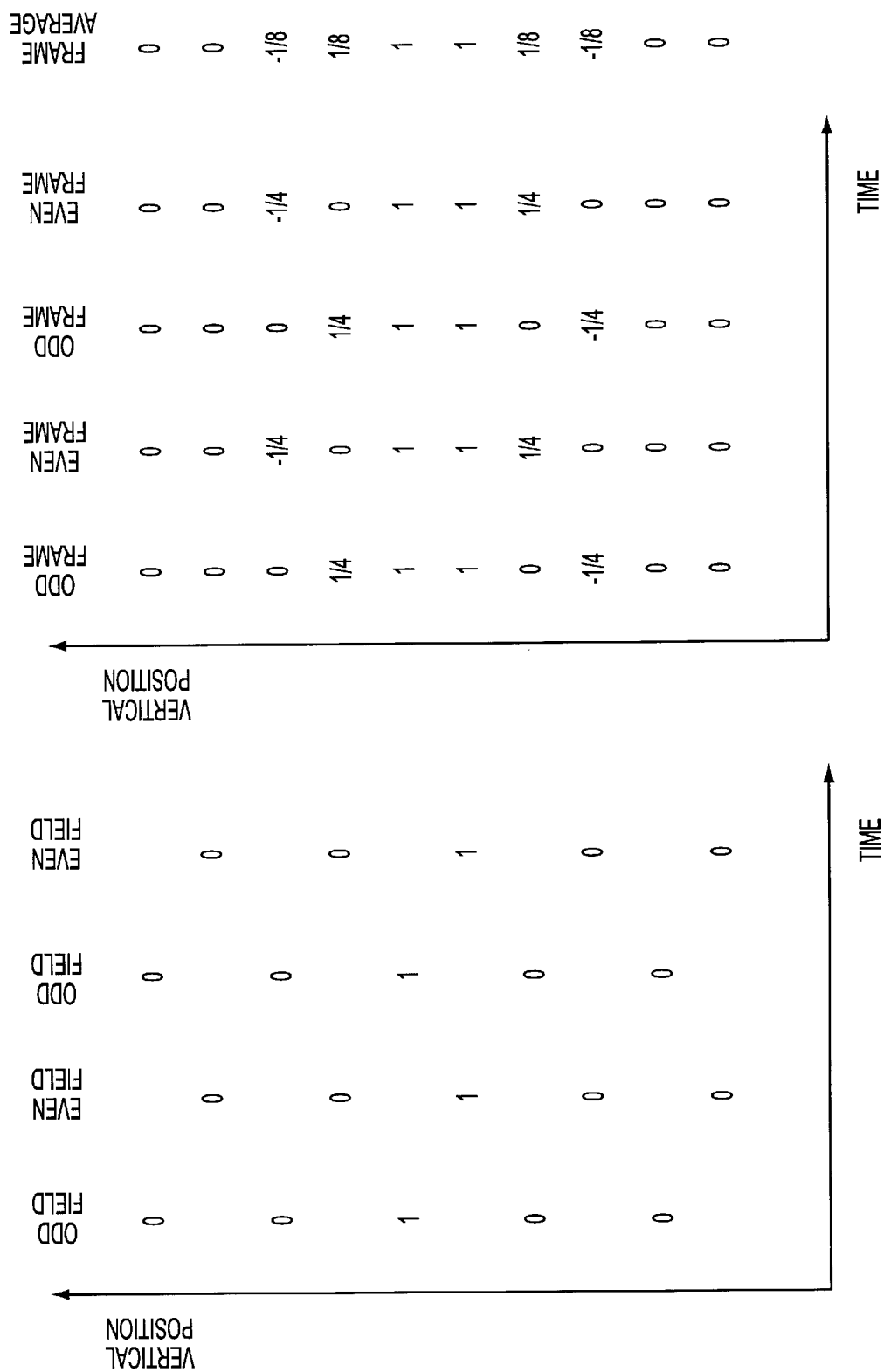
FIG. 9 is a numerical example of vertical-temporal interpolation, according to the method of the present invention.

FIG. 9 shows the impulse response to the same input sequence as in FIG. 4 but using vertical-temporal interpolation as provided by the present invention. The noise and/or onset of motion that caused the transition to the motion case is not reflected in the data values of FIG. 9 since it is assumed to be small. It should be noted that the line doubled output sequence still contains a periodic component but to a much lesser degree than that associated with simple vertical interpolation as shown in FIG. 4.

Figure 10:
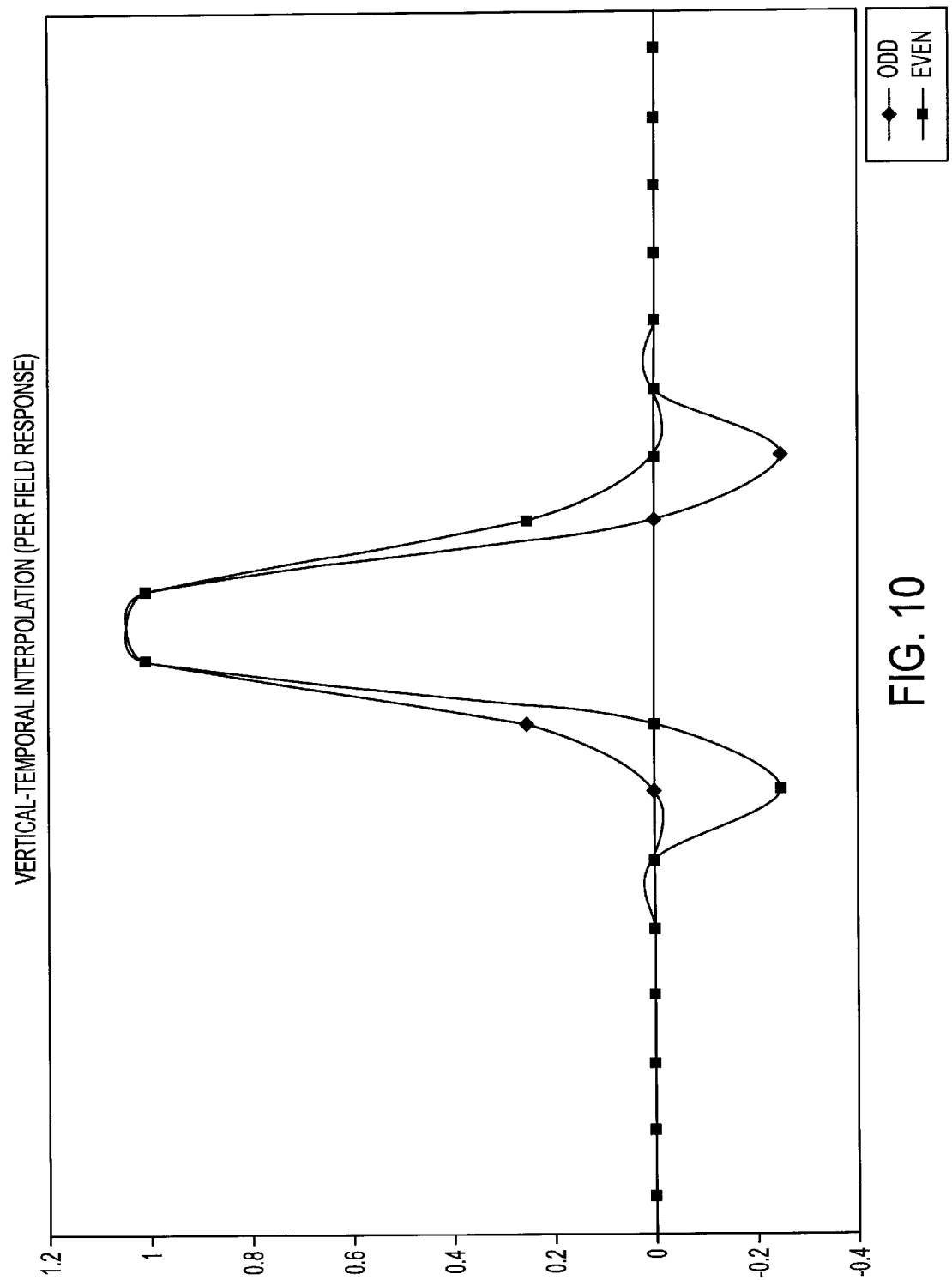
FIG. 10 and FIG. 11 are graphical representations of the example of FIG. 9.
Figure 11:
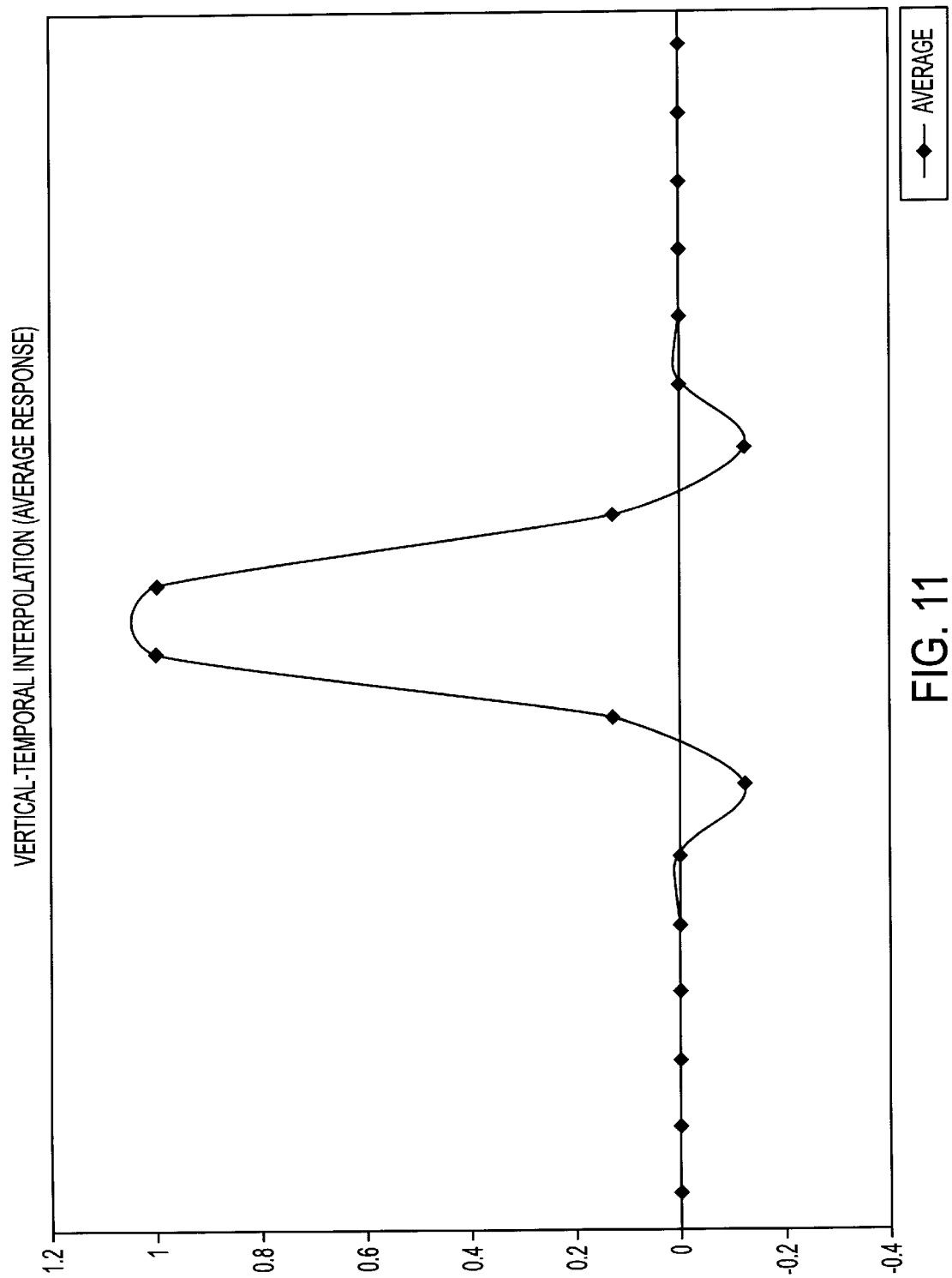

FIG. 10 shows a graphical representation of the example of FIG. 9. The two lines represent the impulse response for each field when vertical-temporal interpolation is used. It should be noted that there is only a slight difference between the response for each field as compared with vertical interpolation indicating that flicker is significantly reduced through the use of vertical-temporal interpolation. Similarly, the frame averaged impulse as shown in FIG. 11 is much sharper than that of FIG. 6, indicating that the sharpness perceived by the viewer will also be improved. Moreover, the change in appearance of an image detail owing to the onset of motion is significantly reduced as compared to vertical interpolation. Thus, the amplification of noise and the appearance of scintillation artifacts commonly associated with motion adaptive de-interlacers is effectively avoided.

Figure 12:
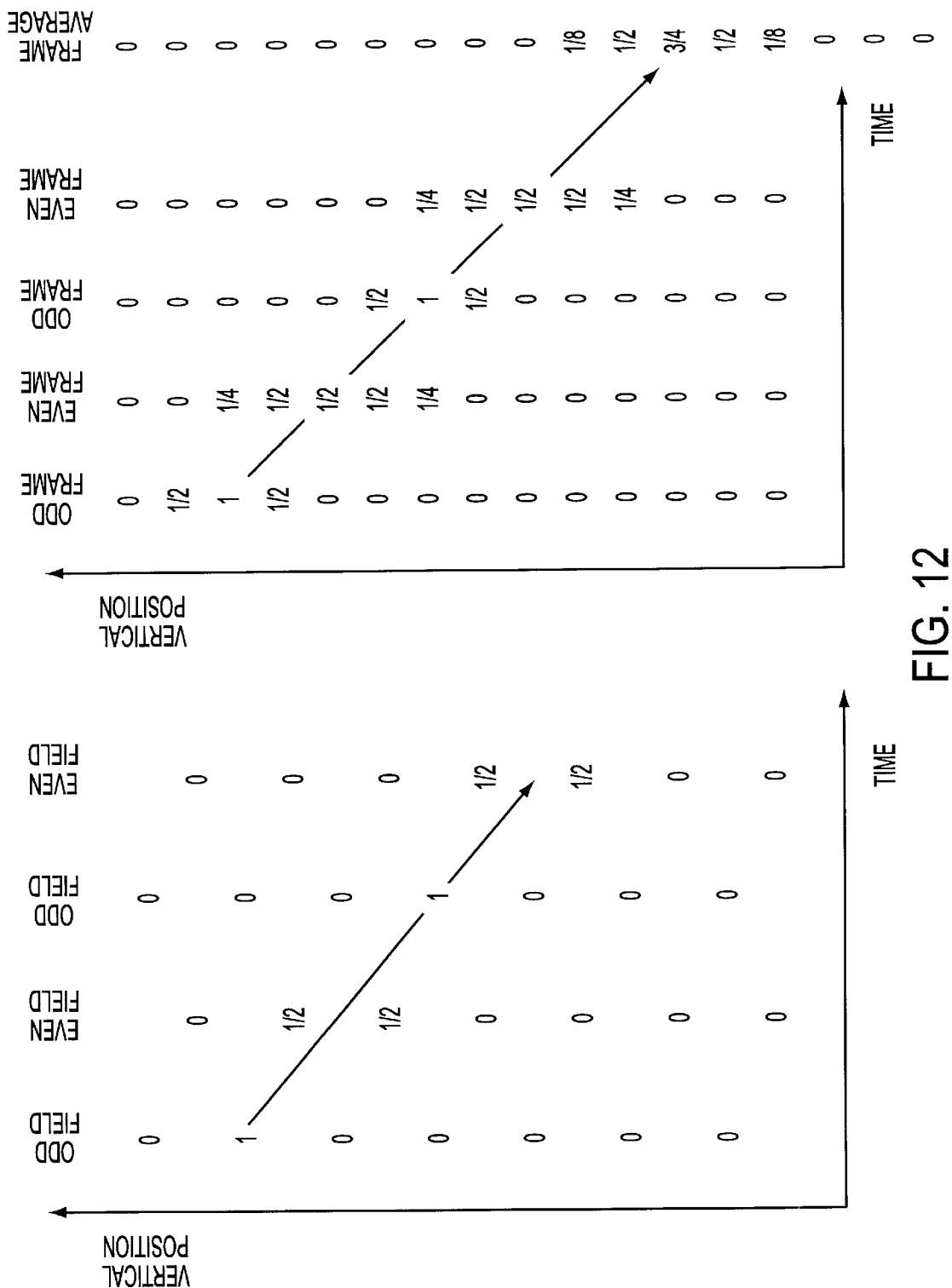
FIG. 12 is a numerical example of vertical interpolation in the presence of vertical motion.

FIG. 12 shows the response of the vertical interpolator of FIG. 3 to an impulse moving vertically downward at a velocity of 1 line/field as referred to the input field resolution. The reproduction of the impulse in each output frame is essentially the same as it would be for a static impulse, since vertical interpolation does not depend on neighbouring fields (the only slight difference in this example is due to a difference in the input impulse itself). If the observer's eye tracks the motion of the impulse, the frame average perceived by the viewer will be the average of successive frames which are shifted in accordance with the optical flow. The trajectory along which frame averaging occurs during eye tracking is indicated by the arrow.

Figure 13:
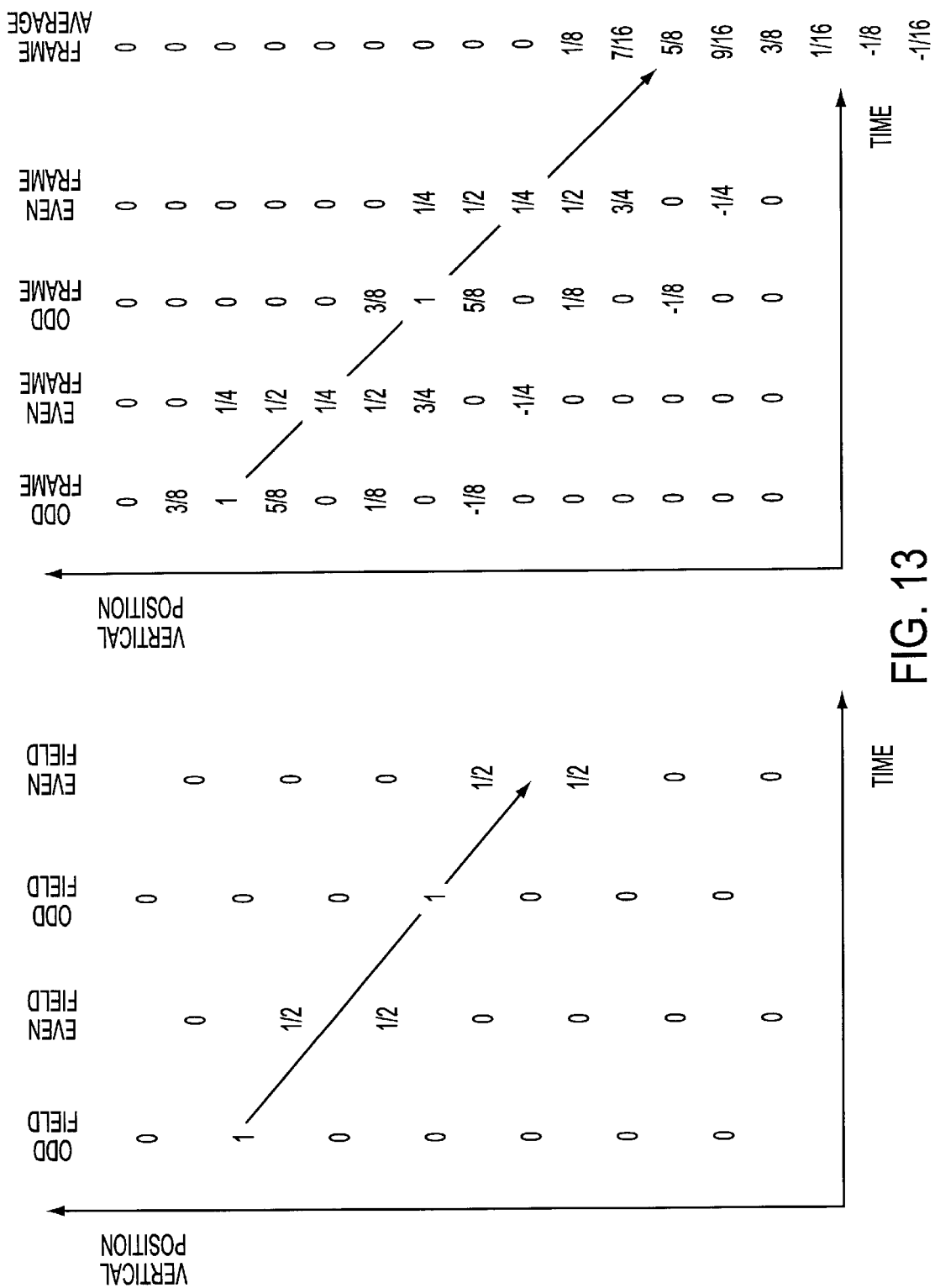
FIG. 13 is a numerical example of vertical-temporal interpolation in the presence of vertical motion.
Figure 14:
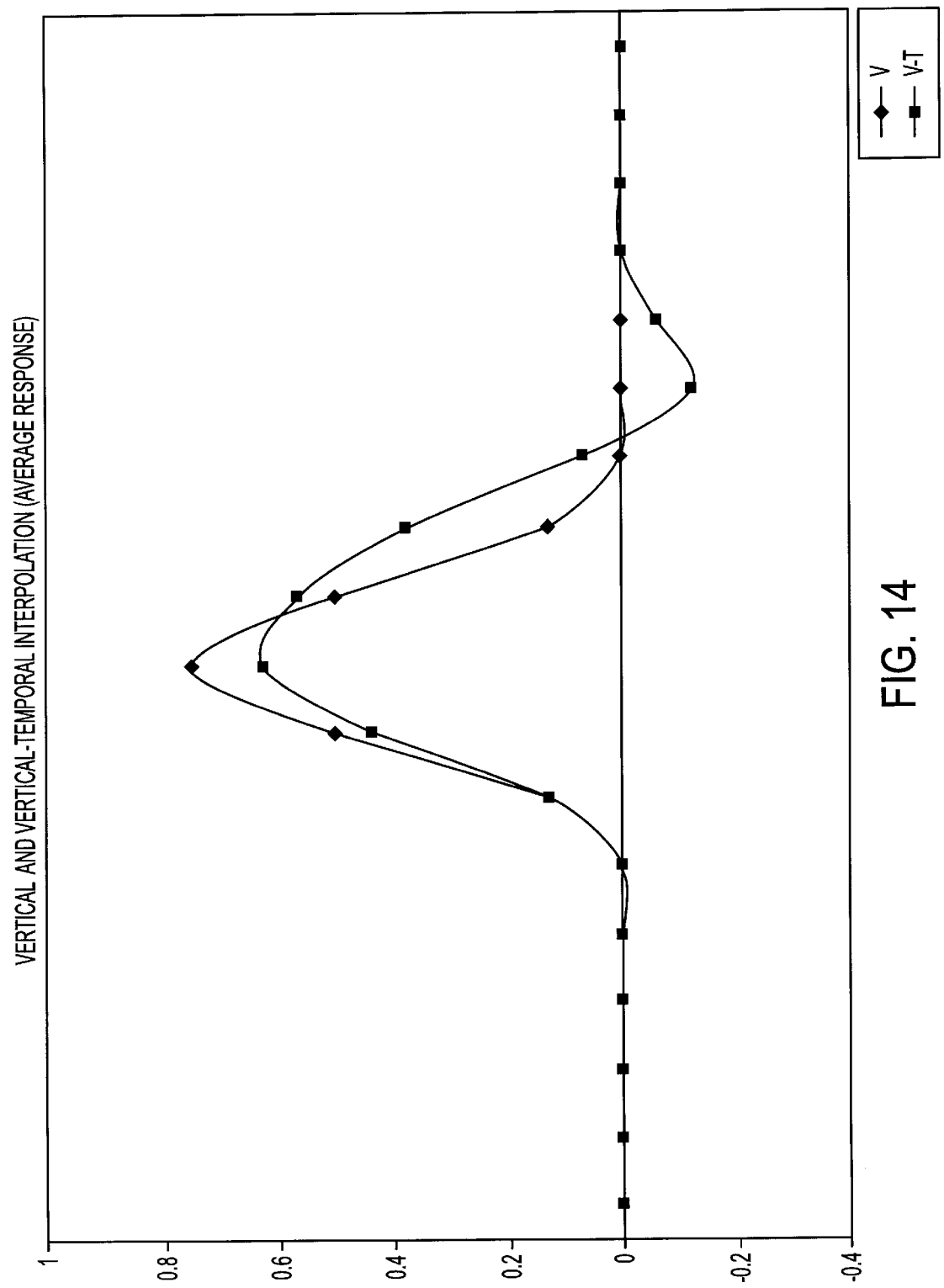
FIG. 14 is a graphical representation of the examples of FIG. 12 and FIG. 13.

The response of the inventive vertical-temporal interpolator of FIG. 7 to the moving impulse is shown in FIG. 13. Graphical representations of the frame averaged vertical and vertical-temporal responses to the moving impulse with eye tracking are shown in FIG. 14.

The frame averaged impulse response of the vertical interpolator of FIG. 3 is essentially unchanged from the response to the static case (when processed using vertical interpolation). The response of the inventive vertical-temporal interpolator of FIG. 7, however, is less sharp compared to that of the vertical interpolator as shown by the flatter impulse response. Thus, the use of vertical-temporal interpolation at higher vertical velocities suffers slightly in terms of impulse response relative to prior art vertical interpolators. On balance, however, this slight reduction represents a reasonable trade off since vertical motion is frequently within the range of velocity where vertical-temporal interpolation still adds value.

Figure 15:
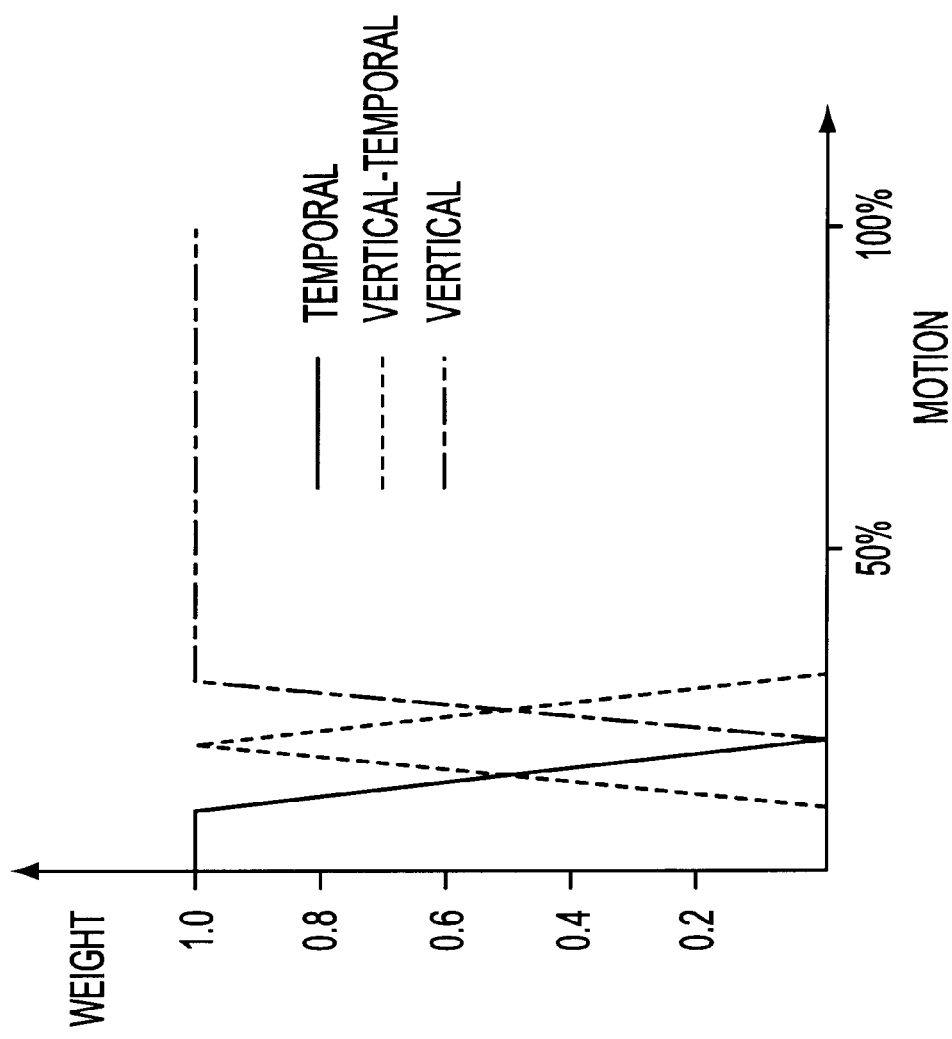
FIG. 15 is a schematic representation showing how a missing pixel may be generated using a combination of temporal, vertical-temporal and vertical interpolation, depending on the level of motion.

In another embodiment of the present invention, it is possible to exploit the benefits of vertical-temporal interpolation at the onset of motion, while avoiding its pitfalls for higher motion, by blending between vertical-temporal and vertical interpolation, as well as blending between temporal and vertical-temporal interpolation. Referring to FIG. 15, in the absence of motion missing pixels are generated using only temporal interpolation. At the onset of motion, missing pixels are generated using a weighted combination of temporal and vertical-temporal interpolation, with an increase in the weighting of the vertical-temporal component for increasing motion. As motion increases further, missing pixels are generated using a weighted combination of vertical-temporal and vertical interpolation, with an increase in the weighting of the vertical component for higher levels of motion. Thus, the benefits of vertical-temporal interpolation are exploited for low motion while the benefits of pure vertical interpolation are exploited for high motion.

The benefits derived from the above-described technique depend somewhat on the method of motion detection used. Although the present invention is not limited to use with any particular method of motion detection, one of the simplest and preferred methods is based on finding the absolute difference between similarly located pixels in successive input fields. While the advantage of vertical-temporal interpolation over vertical interpolation is greatest over a finite range of velocities, the above method of measuring motion does not produce a direct measure of the actual velocity as might be desirable. For instance, a sharp edge with high contrast moving at low velocity may still produce a large difference between similarly located pixels in successive frames, which would be interpreted as high motion. Even so, some correlation does exist between actual velocity and the measure of motion provided by the absolute difference method of FIG. 15 is of value.

It should be noted that it is not necessary to adhere strictly to the weighting schemes in any of the preceding examples. An arbitrary two-dimensional, non-separable, vertical-temporal interpolation filter whose response is altered according to the level of motion, may also be used to advantage.

The weightings referred to in the preceding examples may be applied in more than one way with similar results. For instance, separate estimates based on pure temporal and vertical-temporal interpolation may be derived first with appropriate weighting factors subsequently applied to provide separate weighted estimates. The weighted estimates are summed in order to generate the final result. Alternatively, the separate estimates can include an estimate based on vertical interpolation in addition to the pure temporal and vertical-temporal interpolation. Also, the weighting factors may be already "built in" to the coefficients associated with each of the neighbouring pixels from which a contribution is derived, such that the coefficients already include a predetermined level of motion weighting. In the latter case, the pre-weighted coefficients may be either generated dynamically based on the weighting factor, or selected from among multiple sets of pre-calculated coefficients.

Figure 16:
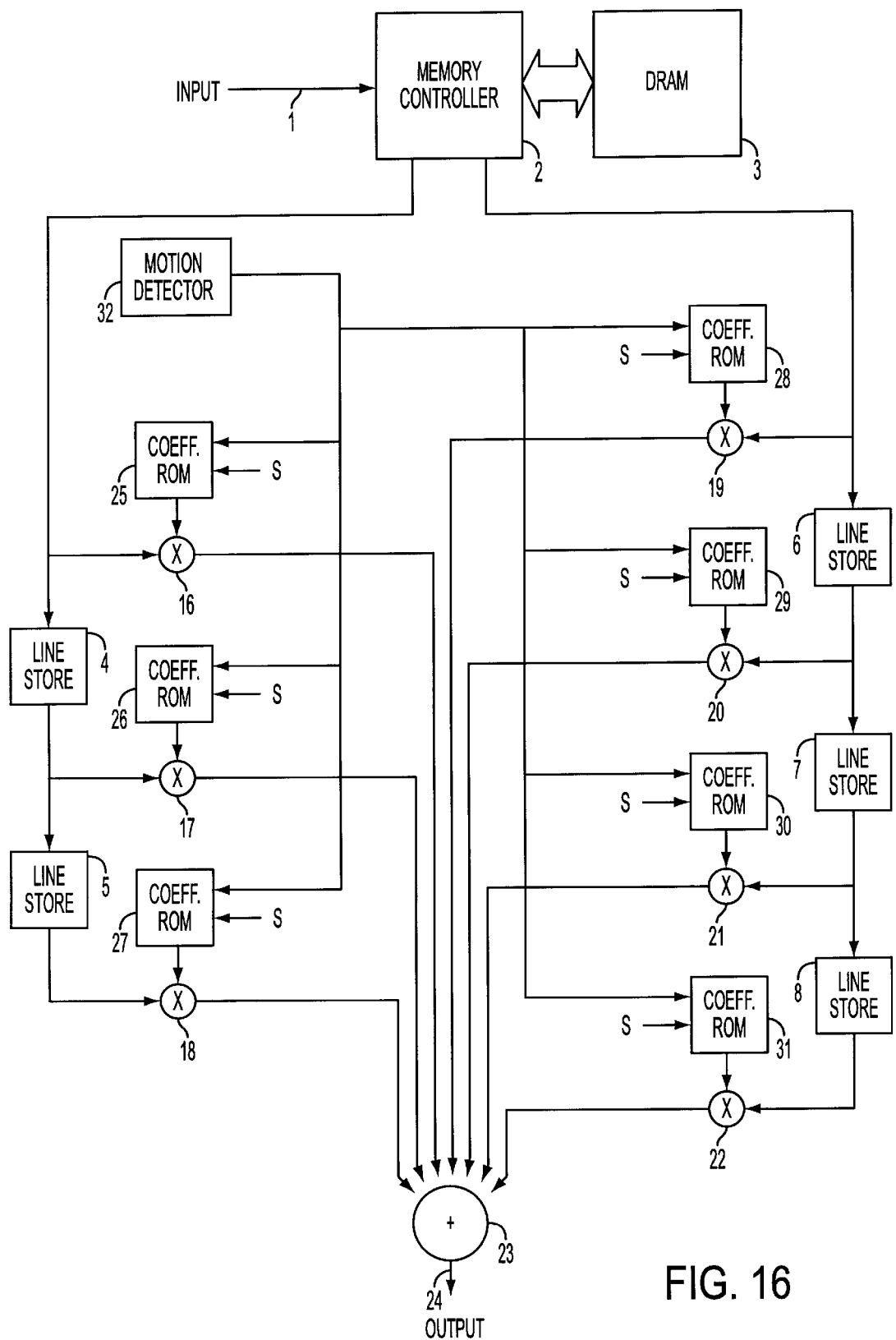
FIG. 16 is a block diagram of an apparatus for implementing the method according to one embodiment of the present invention.

One embodiment of the method of the present invention can be implemented using an arrangement of storage elements, coefficient ROMs, and arithmetic elements as shown in FIG. 16. Specifically, a method similar to that shown in FIG. 7, however, not including weighted contribution from the line labeled C and including two additional lines providing weighted contributions, one line above the line labeled A and one line below the line labeled B, can be implemented using the apparatus shown in FIG. 16. As each field of an interlaced video signal 1 arrives at the input to a memory controller 2, it is written into a memory 3. Concurrently with the operation of writing data into memory, data from the previous field is retrieved from memory and applied to the input of line store element 6 and multiplier 19 while data from the most recently received field is routed through the memory controller and applied to the input of line store element 4 and multiplier 16. In an alternative mode of operation, data from the most recently received field may be retrieved from memory and applied to the input of line store element 4 and multiplier 16 rather than being routed directly through the memory controller. As new data is stored in line store 4, the previously stored data is output and applied to the input of line store 5 where it replaces the previously stored data. In a similar fashion, the data in line store 6 replaces the data in line store 7 which replaces the data in line store 8. Data which is placed into any line store remains for one input line period which is equal to two output line periods before it is replaced with new data. A motion detector 32 generates a motion signal that is used in conjunction with a selector signal S to address coefficient ROMs 25–31. During one output line period, the selector signal S causes coefficient ROMs 25–31 to drive out a first set of coefficients that are selected based on the degree of motion detected by the motion detector 32. The first set of coefficients are used to generate the interpolated missing lines. During the next output line period, the selector signal causes an alternate set of coefficients to be driven out, which are used to modify the existing lines (if necessary, depending on the interpolation filter design). The selector signal S is generated by a controller (not shown) in a well known manner. The selected coefficients which appear at the outputs of coefficient ROMs 25–31 are applied to one of the inputs of each of multipliers 16–22, respectively. The other input of each multiplier 17, 18 and 20–22 is driven by the outputs of line stores 4–8, respectively. When the outputs from multipliers 16–22 are summed together using adder 23, the output 24 is the desired progressively scanned video signal.

A person of ordinary skill in the art will appreciate that the weighting coefficients may be generated by circuitry on-the-fly, rather than being predetermined and stored in ROMs. Rather than selecting from among predetermined weighting coefficients based on the degree of motion, weighting coefficients can be generated dynamically using coefficients based on vertical-temporal and temporal interpolation, independent of degree of motion. These coefficients are then multiplied by factors (alpha and 1-alpha, respectively) based on the degree of motion and then corresponding coefficient components are added together to produce the dynamically generated weighting coefficients. It will also be appreciated that the apparatus described above need not include the line stores as described. With sufficient bandwidth, all of the lines may be concurrently retrieved from the memory 3 through the memory controller 2 rather than being passed consecutively through the line stores using, for example, FIFOs for simultaneously providing multiple streams of pixel data to the inputs of multipliers 16–22.

Figure 17:
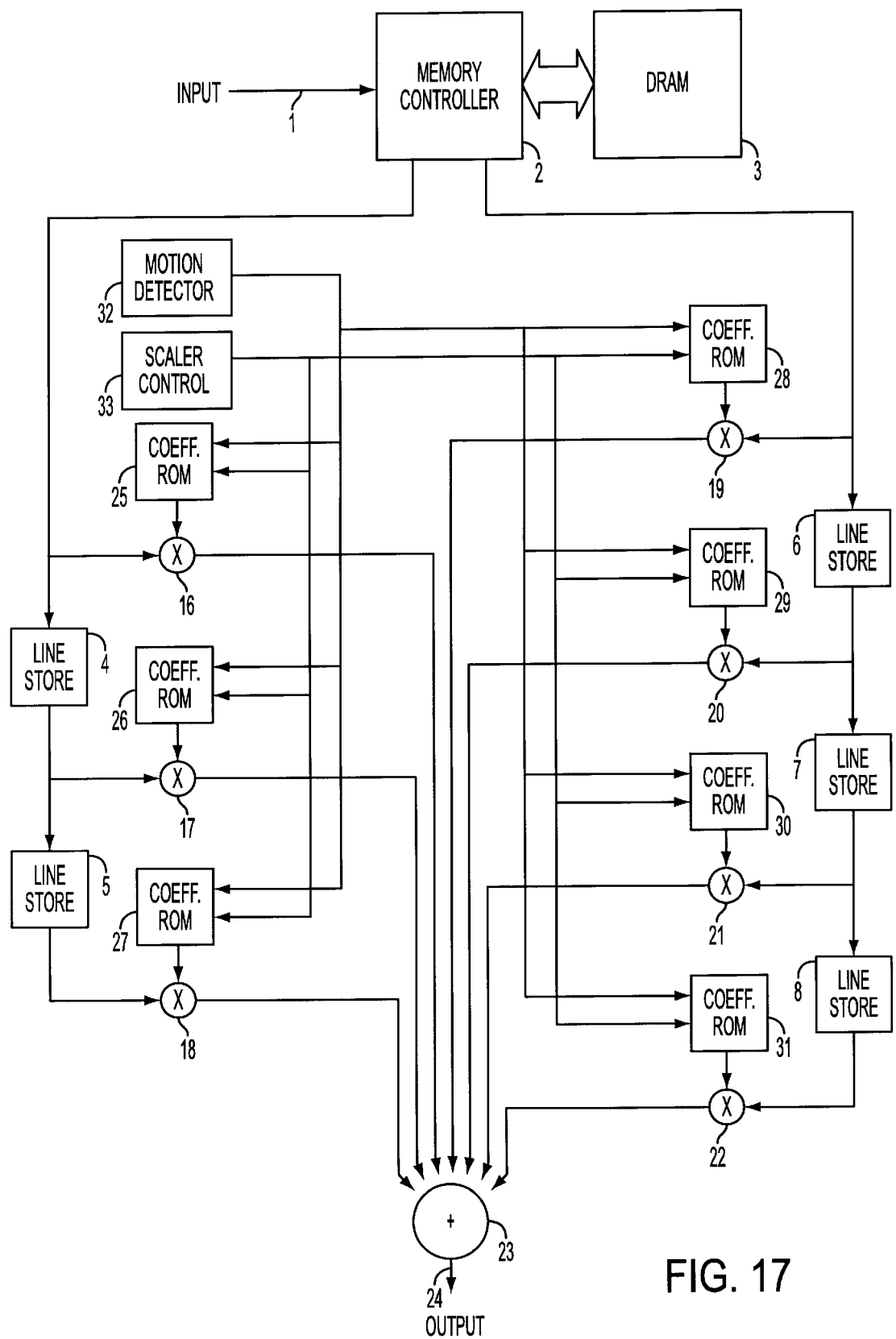
FIG. 17 is a block diagram of an apparatus according to an alternative but equally preferable embodiment for implementing the method of the present invention and for performing arbitrary vertical scaling.

The foregoing description of a preferred embodiment of the system of the present invention is not restricted to the specific best mode set forth herein. Indeed, the flexible nature of software programming is such that the broad concepts of the invention may be implemented using software rather than hardware as set forth herein. Also, as indicated above, the principles of the invention are not limited to the specific case of line doubling. An obvious extension of this method would be to combine the method of the present invention with additional operations such as scaling in order to produce a greater or lesser number of lines. Furthermore, such scaling may include scaling by a non-integer multiple and could either be implemented using a separate processing stage or could be combined with the method of the present invention and implemented using a single composite structure. In the latter case, the coefficients may be split into a number of phases corresponding to an equal number of spatial regions which fall between the input video lines. When an output line must be generated which falls within a given spatial region, the coefficient set which corresponds to that phase is selected. FIG. 17 shows an apparatus for implementing the above method in which coefficients are split into phases to enable interpolation at arbitrary positions. The apparatus is similar to that shown in FIG. 16 except that the selector signal S has been replaced by a phase selector bus connected to a scaler control circuit 33 and the address space of the coefficient ROMs 25–31 has been increased accordingly. All of the phases for each filter tap are stored within its associated coefficient ROM. Depending on the desired spatial position of the output video line, the phase selector signal which is generated by the scaler control circuit 33 in a well known manner, is used to address the appropriate set of coefficients.

It will be appreciated that the present invention can also be used to produce an interlaced video signal of a format that differs from that which is inputted. For example, the present invention may be used to advantage to effect conversion from 480I (standard definition interlaced format with 240 active lines per field and a total of 480 lines per frame) to 1080I (high definition interlaced format with 540 active lines per field and a total of 1080 lines per frame). Regardless of whether an odd or even field is to be outputted, a required output line can be mapped to a corresponding position relative to the input lines. As described above for the progressive output case, when an output line must be generated which falls within a given spatial region, the coefficient set which corresponds to that phase is selected.

A person understanding the present invention may conceive of other embodiments and variations thereof without departing from the sphere and scope of the invention as defined by the claims appended hereto.

We claim:

1. A method for generating an interpolated pixel at a vertical position in a field of a video frame, comprising:
   receiving at least two pixels vertically adjacent said vertical position in said field and at least three pixels from at least one adjacent field;
   detecting a degree of motion in the vicinity of said interpolated pixel;
   providing weighting factors based on said degree of motion; and
   calculating said interpolated pixel based on a combination of weighted contributions from said at least two pixels and said at least three pixels, said weighted contributions being derived from a combination of said weighting factors and at least vertical-temporal and temporal interpolation, wherein for at least one degree of said motion said weighted contributions comprise at least (i) a first positive contribution derived from immediately adjacent ones of said at least two pixels, (ii) a second positive contribution derived from a central one of said at least three pixels located at said vertical position, and (iii) a negative contribution derived from the two of said at least three pixels that are immediately vertically adjacent said central pixel.

2. The method for generating an interpolated video pixel according to claim 1, further comprising the step of providing a plurality of coefficients prior to the step of calculating said interpolated pixel and wherein the step of calculating includes: selecting respective coefficients from said plurality of coefficients for each of said pixels, based on said weighting factors and said at least vertical-temporal and temporal interpolation; multiplying said at least two pixels and said at least three pixels by said respective coefficients in order to produce said weighted contributions; and summing said weighted contributions.

3. The method for generating an interpolated video pixel according to claim 1, further comprising the step of providing a plurality of coefficients prior to the step of calculating said interpolated pixel and wherein the step of calculating includes multiplying said coefficients by said weighting factors based on said degree of motion to provide a plurality of resulting products; adding together ones of the resulting products to provide weighting coefficients based on said degree of motion; multiplying said weighting coefficients by said at least two pixels and said at least three pixels to produce said weighted contributions and summing said weighted contributions.

4. The method for generating an interpolated video pixel according to claim 1, wherein the step of calculating said interpolated pixel comprises: performing at least vertical-temporal interpolation and temporal interpolation using said at least two and said at least three pixels to provide at least first and second estimates, respectively, based on contributions from said at least two pixels and said at least three pixels; multiplying said estimates by said weighting factors to provide said weighted contributions; and summing said weighted contributions.

5. The method for generating an interpolated video pixel according to claim 2 wherein the selected coefficients associated with said at least two pixels sum substantially to one, in the presence of motion.

6. The method for generating an interpolated video pixel according to claim 3 wherein the weighting coefficients associated with said at least two pixels sum substantially to one, in the presence of motion.

7. The method for generating an interpolated video pixel according to claim 2 wherein the selected coefficients associated with said at least three pixels sum substantially to one, in the absence of motion.

8. The method for generating an interpolated video pixel according to claim 3 wherein the weighting coefficients associated with said at least three pixels sum substantially to one, in the absence of motion.

9. The method for generating an interpolated video pixel according to claim 1 wherein said first positive contribution increases with increasing degree of motion.

10. The method for generating an interpolated pixel according to claim 1 wherein said interpolated video pixel forms part of a progressively scanned output frame.

11. The method for generating an interpolated pixel according to claim 1 wherein said interpolated pixel forms part of interlaced output field.

12. An apparatus for generating an interpolated pixel at a vertical position in a field of a video frame, comprising:
   memory for receiving at least two pixels vertically adjacent said vertical position in said field and at least three pixels from at least one adjacent field;
   a motion detector for detecting a degree of motion in the vicinity of said interpolated pixel and for providing weighting factors based on said degree of motion; and
   a calculation device for calculating said interpolated pixel based on a combination of weighted contributions from said at least two pixels and said at least three pixels, said weighted contributions being derived from a combination of said weighting factors and at least vertical-temporal and temporal interpolation, wherein said weighted contributions comprise at least (i) a first positive contribution derived from immediately adjacent ones of said at least two pixels, (ii) a second positive contribution derived from a central one of said at least three pixels located in said vertical position, and (iii) a negative contribution derived from ones of said at least three pixels that are immediately vertically adjacent said central pixel.

13. The apparatus according to claim 12 wherein said memory for receiving said at least two pixels and said at least three pixels comprises a plurality of line stores.

14. The apparatus according to claim 13 further comprising a device for providing a plurality of coefficients.

15. The apparatus according claim 14 wherein said device for providing a plurality of coefficients comprises a memory for providing said plurality of coefficients.

16. The apparatus according to claim 15 wherein said memory for providing said plurality of coefficients comprises a plurality of read-only memory devices.

17. The apparatus according claim 14 wherein said calculation device comprises a plurality of multipliers for multiplying said at least two pixels and said at least three pixels by said weighting coefficients to provide said weighted contributions and an adder for summing said weighted contributions.

18. The apparatus according to claim 12 wherein said memory for receiving said at least two pixels and said at least three pixels comprises a plurality of FIFO units in order to simultaneously provide respective pixels to said multipliers.

19. The apparatus according to claim 12, further comprising a memory controller including memory for receiving fields of said video frame and for providing said pixels to said memory.

20. A method for generating an interpolated pixel at a vertical position in a field of a video frame, comprising:
receiving at least two pixels vertically adjacent said vertical position in said field and at least three pixels from at least one adjacent field;
detecting a degree of motion in the vicinity of said interpolated pixel;
providing weighting factors based on said degree of motion;
providing a plurality of coefficients;
selecting respective coefficients from said plurality of coefficients for each of said pixels, based on said weighting factors and at least vertical-temporal and temporal interpolation;
multiplying said at least two pixels and said at least three pixels by said respective coefficients in order to produce said weighted contributions; and
summing said weighted contributions,
wherein for at least one degree of said motion said weighted contributions comprise at least (i) a first positive contribution derived from immediately adjacent ones of said at least two pixels, (ii) a second positive contribution derived from a central one of said at least three pixels located at said vertical position, and (iii) a negative contribution derived from the two of said at least three pixels that are immediately vertically adjacent said central pixel.

21. A method for generating an interpolated pixel at a vertical position in a field of a video frame, comprising:
receiving at least two pixels vertically adjacent said vertical position in said field and at least three pixels from at least one adjacent field;
detecting a degree of motion in the vicinity of said interpolated pixel;
providing weighting factors based on said degree of motion;
providing a plurality of coefficients;
multiplying said coefficients by said weighting factors based on said degree of motion to provide a plurality of resulting products;
adding together ones of the resulting products to provide weighting coefficients based on said degree of motion;
multiplying said weighting coefficients by said at least two pixels and said at least three pixels to produce said weighted contributions; and
summing said weighted contributions,
wherein for at least one degree of said motion said weighted contributions comprise at least (i) a first positive contribution derived from immediately adjacent ones of said at least two pixels, (ii) a second positive contribution derived from a central one of said at least three pixels located at said vertical position, and (iii) a negative contribution derived from the two of said at least three pixels that are immediately vertically adjacent said central pixel.

22. A method for generating an interpolated pixel at a vertical position in a field of a video frame, comprising:
receiving at least two pixels vertically adjacent said vertical position in said field and at least three pixels from at least one adjacent field;
detecting a degree of motion in the vicinity of said interpolated pixel;
providing weighting factors based on said degree of motion;
performing at least vertical-temporal interpolation and temporal interpolation using said at least two and said at least three pixels to provide at least first and second estimates, respectively, based on contributions from said at least two pixels and said at least three pixels;
multiplying said estimates by said weighting factors to provide weighted estimates; and
summing said weighted estimates,
wherein for at least one degree of said motion the summed weighted estimates comprise at least (i) a first positive contribution derived from immediately adjacent ones of said at least two pixels, (ii) a second positive contribution derived from a central one of said at least three pixels located at said vertical position, and (iii) a negative contribution derived from the two of said at least three pixels that are immediately vertically adjacent said central pixel.

* * * * *